Patented May 25, 1943

2,320,257

UNITED STATES PATENT OFFICE 2,320,257

PROCESS FOR DRYING NITROSYL CHLORIDE GAS

Herman A. Beekhuis, Jr., Petersburg, Va., assignor to The Solvay Process Company, New York, N. Y., a corporation of New York No Drawing. Application March 3, 1939, Serial No. 259,578

12 Claims. (Cl. 23—157)

This invention relates to a process for drying a gas containing nitrosyl chloride, particularly the moist mixture of nitrosyl chloride and chlorine such as is obtained in reacting nitric acid with a metal chloride.

A moist nitrosyl chloride gas is highly corrosive to substantially all metallic materials available for the construction of apparatus for the treatment of such a gas. Because of this extremely corrosive nature of the moist gas and of liquefied nitrosyl chloride containing moisture, the drying of such a gas presents special difficulties. While the gas may be dried by indirectly cooling it to a low temperature to condense the moisture, ordinary metallic materials, having a high heat conductivity and thus suitable for construction cooling coils and the like, are severely corroded.

I have now discovered a nitrosyl chloride gas, which may also contain chlorine, may be especially effectively dried by contacting the gas with liquefied nitrosyl chloride or a mixture of liquid nitrosyl chloride and chlorine, to condense and absorb moisture present in the gas. By contacting the gas with liquid nitrosyl chloride the gas may be cooled without having to indirectly transfer heat to a cooling medium. Instead, heat is absorbed directly from the gas by the liquid. The liquefied nitrosyl chloride serves to dilute the aqueous condensate which forms, thus increasing the effectiveness with which the moisture, both free and combined, is removed from the gas. Further, the liquefied nitrosyl chloride serves to wash any aqueous condensate out of the gas and prevent condensate being entrained by the gas leaving the drying step.

In drying a gas containing nitrosyl chloride, with or without chlorine, in accordance with the process of this invention the gas containing free or combined moisture is scrubbed with liquid nitrosyl chloride or a mixture of liquid nitrosyl chloride and chlorine, preferably in a tower through which the liquid is passed in countercurrent flow with the gas. The liquid is contacted with the gas in amount sufficient to condense and absorb substantially all of the moisture. It is preferred to maintain a substantial excess of liquid nitrosyl chloride or its mixture with liquid chlorine in the liquid contacted with the gas, for example, at least 50% of the liquid is nitrosyl chloride and chlorine throughout its contact with the gas being dried. When the moist gas initially contains 1% total moisture (by weight) or less, it is preferred to use 1 part by weight of liquid nitrosyl chloride and chlorine to dry 4 to 40 parts by weight of gaseous nitrosyl chloride or a mixture of nitrosyl chloride and chlorine by passing the liquid in countercurrent flow with the gas. Thus in drying a gas in accordance with this invention the gas is scrubbed with liquefied nitrosyl chloride or mixture of liquefied nitrosyl chloride and chlorine in amount equivalent to only a minor proportion of the nitrosyl chloride or nitrosyl chloride and chlorine present in the gas. The major proportion of the nitrosyl chloride or mixture of nitrosyl chloride and chlorine present in the gas is obtained as a dry gas suitable for treatment as desired.

By scrubbing a nitrosyl chloride gas with liquefied nitrosyl chloride in accordance with this invention, the moisture content of the gas may be reduced to less than 0.1% or even to less than 0.01% by weight of total moisture; i. e., both free and combined water. Nitrosyl chloride alone or with chlorine reacts with water to form nitric and hydrochloric acids. Nitric acid and hydrochloric acid react to form water, nitrosyl chloride and chlorine. Accordingly, in dealing with mixtures of nitrosyl chloride and water, with or without chlorine, hydrochloric and nitric acids present are equivalent to water in the ratio of each gram mol of HCl or $HNO_3$ being equivalent to 9 grams of water. These acids, therefore, are considered in this art to be combined water and it is in that sense, as referring to hydrochloric and nitric acids present in a gas containing nitrosyl chloride the term "combined water" is used herein.

The liquefied nitrosyl chloride or mixture of nitrosyl chloride and chlorine used for drying a gas in accordance with this invention may advantageously be obtained by cooling the dried gas to condense nitrosyl chloride, with or without chlorine, and contacting a portion of the liquefied nitrosyl chloride or its mixture with chlorine thus obtained with additional moist gaseous nitrosyl chloride which is to be dried. When the nitrosyl chloride gas initially contains a large proportion of moisture, it is desirable to first contact the gas with cool concentrated nitric acid to remove a portion of the moisture contained in the gas. For example, the gas may be scrubbed with 40% or stronger nitric acid at a temperature of 30° C. or lower. Following removal of a portion of the moisture by means of this nitric acid, the partially dried gas is then scrubbed with liquid nitrosyl chloride or its mixture with liquid chlorine to remove substantially all of its remaining moisture content.

The process of this invention may be carried out at a pressure either below or above atmospheric. The temperature maintained in drying the nitrosyl chloride gas, however, should be modified in proportion to the change in boiling point of the liquefied nitrosyl chloride or nitrosyl chloride-chlorine mixture with the change in pressure. Thus, when operating at 2 atmospheres pressure absolute the general temperature level in the drier is raised by about 17° C. above the temperature level maintained when operating at 1 atmosphere absolute to effect substantially the same drying of the gas.

In drying mixtures of nitrosyl chloride and chlorine, the same procedure may be followed using a mixture of liquid nitrosyl chloride and chlorine for drying the gas as in using liquid nitrosyl chloride for drying gaseous nitrosyl chloride. The condensate obtained by cooling the dried nitrosyl chloride-chlorine gas to condense a portion of these constituents of the gas may be used for drying additional quantities of the moist gas. An excess of the liquid $NOCl-Cl_2$ mixture is maintained in contact with the gas being dried so that the liquid phase contains at least 50% of nitrosyl chloride and chlorine. Further, 1 part by weight of the mixture of liquid $NOCl-Cl_2$ may be used to effectively dry 4 to 40 parts by weight of a gaseous mixture of nitrosyl chloride and chlorine containing 1% total moisture or less.

The process of this invention has numerous important advantages. Thus, liquid nitrosyl chloride may be readily obtained where moist nitrosyl chloride gas is to be dried. The equipment required for drying the gaseous nitrosyl chloride is simple and the operation readily controlled. An especially important advantage of the process is that it solves the problem presented by the highly corrosive nature of moist nitrosyl chloride. No indirect transfer of heat is required for the drying of the gas. Accordingly, ceramic materials such as chemical stoneware or glass, which are resistant to corrosion by moist nitrosyl chloride but are poor conductors of heat and mechanically unsuited for constructing apparatus in which heat is indirectly transferred through walls of such materials on the large scale required in chemical manufacture, may be used for the vessels or towers in which the gas is dried. I have found that if nitrosyl chloride is dry a number of metals and alloys, for example nickel and alloys containing a high percentage of nickel, are resistant towards corrosion by the dry nitrosyl chloride. By drying a moist nitrosyl chloride gas in accordance with the process of this invention the metal materials resistant to corrosion by dry nitrosyl chloride such as nickel or alloys containing 45% or more nickel, which have relatively good heat transfer capacities and are suitable for construction of indirect coolers, may be used for cooling and liquefying the dried gas or otherwise treating it.

When used for treating the mixture of nitrosyl chloride and chlorine evolved by reaction of nitric acid and a metal chloride the process of this invention is additionally advantageous since no wastage of chemicals occurs in the process. The liquid nitrosyl chloride and chlorine used for drying the gas and drawn from the drying vessel charged with moisture may be incorporated in the nitric acid-salt reaction mixture and the nitrosyl chloride and chlorine recovered, including that generated by reaction of hydro-chloric and nitric acids present in the liquid nitrosyl chloride and chlorine.

The invention will be more completely illustrated and described by the following examples, although it is not limited thereto:

*Example I.*—A mixture of about equal proportions by volume of nitrosyl chloride and chlorine gas obtained by reaction of sodium chloride with nitric acid and saturated with acid and water vapors in contact with the reaction mixture at about 75° C., is passed upwardly through a bubble cap tower. The tower is made of chemical stoneware or other ceramic, glass or other material suitably resistant to moist mixtures of nitrosyl chloride and chlorine. A mixture of liquid nitrosyl chloride and chlorine at about −40° C. is fed to the top of the tower and passed downwardly therethrough in contact with the gas passing upwardly through the tower. The rate of feed of the liquid nitrosyl chloride-chlorine mixture to the top of the tower is such as to maintain a temperature of about 0° C. in the bottom portion of the tower. For example, if the temperature in the bottom of the tower falls below −5° C. the feed of liquid nitrosyl chloride is decreased and if the temperature rises above 5° C. the feed of liquid is increased to maintain the temperature within this range. The liquid nitrosyl chloride-chlorine containing water and nitric and hydrochloric acids drawn from the bottom of the tower may be incorporated in a reaction mixture of nitric acid and sodium chloride which is treated to evolve the nitrosyl chloride-chlorine gas. The dried gas leaving the top of the tower is passed through a nickel cooler where it is cooled to about −40° C. to liquefy the nitrosyl chloride and chlorine. A portion of the liquefied mixture of nitrosyl chloride and chlorine is introduced to the top of the drying tower for drying the gas passed through this tower in the manner described. The balance is drawn off and treated in any desired manner.

The process of this example may be modified in numerous respects. The dried nitrosyl chloride-chlorine gas passed through the nickel cooler may be cooled to a temperature at which only a portion of the gas is liquefied, in amount sufficient for drying the gas before its passage into the nickel cooler. The temperature in the bottom of the tower may be 25° C. or even higher. The temperature of the gas in the upper part of the drier should, however, be substantially the boiling point of the liquid nitrosyl chloride-chlorine mixture contacted with the gas. In passing downwardly through the tower the liquid becomes decreasingly rich in nitrosyl chloride and chlorine and increasingly rich in water, nitric acid and hydrochloric acid. The liquid drawn from the bottom of the tower may contain relatively little nitrosyl chloride and chlorine and correspond to an aqueous nitric and hydrochloric acid solution saturated with nitrosyl chloride and chlorine.

Various types of equipment are suitable for drying the gas in place of the bubble tower of this example. For example, a ring-packed tower may be used or the gas to be dried may be passed through one or more vessels in series and the liquid nitrosyl chloride and chlorine mixture passed in the opposite direction through the vessels. This series treatment of the gas in a plurality of vessels involves the principle of countercurrent flow of the gas and liquid also employed where the gas passes upwardly and the liquid downwardly through a tower.

*Example II.*—About 100 parts by weight of a liquid mixture of substantially equal mol proportions of nitrosyl chloride and chlorine containing about 0.1% water and 2% $N_2O_4$ by weight, are placed in a vessel provided with a gas inlet pipe dipping below the level of the liquid and with a pipe for drawing off gas from the top of the vessel. A gaseous mixture having a composition substantially the same as that of the liquid is passed at a temperature of 25° C. through the inlet pipe and bubbled through the liquid. An inappreciable amount of moisture is present in the exit gas leaving the vessel for a considerable period of time and, even after 400 parts by weight of gas have been contacted with the liquid and about one-half the original charge of liquid evaporated, the exit gas still contains less than 0.01% of free and combined water.

*Example III.*—60% nitric acid is cooled to about 0° C. and is then passed downwardly through a ring-packed cooling tower countercurrent to a flow of nitrosyl chloride-chlorine gas generated by the reaction of sodium chloride with the nitric acid drawn from the bottom of the cooling tower. The reaction of the salt and nitric acid is carried out by heating a reaction mixture of the two materials. The nitrosyl chloride-chlorine gas formed by the reaction leaves contact with the reaction mixture at a temperature of about 75° C. By passage in direct contact with the cooled nitric acid in the cooling tower the gases are cooled to about 10 C. and the major portion of their moisture content condensed and absorbed in the nitric acid.

The thus cooled and preliminary dried gas is passed upwardly through a bubble cap drying tower in which it is contacted with a mixture of nitrosyl chloride and chlorine. The gas leaving the top of the drying tower is cooled to liquefy the nitrosyl chloride and chlorine and 10% of the liquefied mixture is introduced to the top of the drying tower and used for drying the gas passing through that tower. Liquid nitrosyl chloride-chlorine containing moisture is drawn from the bottom of the drying tower and is mixed with the nitric acid introduced into the top of the cooling tower. The dry liquid nitrosyl chloride-chlorine mixture recovered as a product by this procedure contains less than 0.10% of free and combined water.

By a procedure of the type described in Example III the quantity of liquid nitrosyl chloride-chlorine mixture required to thoroughly dry the hot gases evolved from reaction of nitric acid and a metal chloride may be greatly reduced by an initial cooling and preliminary drying of the gases with the nitric acid subsequently used for reaction with the salt. This type of procedure may be carried out in a single liquid gas contact tower to which the cool nitric acid is fed at about a mid-point of the tower and liquid nitrosyl chloride-chlorine mixture fed to the top of the tower. The rate of feed of the liquid nitrosyl chloride-chlorine mixture to the top of the tower is controlled so that the gas before leaving the tower is intimately contacted with and effectively scrubbed with liquid nitrosyl chloride-chlorine. In a tower containing bubble cap trays on which the liquid and gas are contacted, the rate of feed is such that liquid nitrosyl chloride-chlorine is over-flowing from at least the top two trays of the tower.

The process of this invention is of particular value in the drying of moist mixtures of nitrosyl chloride and chlorine containing 25 parts or more of nitrosyl chloride to every 75 parts of chlorine. Mixtures of these gases are obtained in reacting nitric acid and metal chlorides. For the utilization of such a mixture it is usual to separate the two constituents, which may be done by liquefaction and fractional distillation. By first drying the gas mixture by the process of this invention, their latter treatment is greatly simplified and excessive corrosion of metallic coolers and fractionation columns prevented.

I claim:

1. The process for drying a moist nitrosyl chloride gas which comprises passing said gas in direct contact with liquid nitrosyl chloride in amount sufficient to absorb the moisture from the gas and leave therein less than 0.01% total moisture and withdrawing the nitrosyl chloride gas thus treated from contact with the liquid nitrosyl chloride as a substantially dry gas containing less than 0.01% total moisture.

2. The process for obtaining dry, liquid nitrosyl chloride from a moist nitrosyl chloride gas which comprises passing said moist gas in contact with liquid nitrosyl chloride in amount sufficient to absorb the moisture from the gas and leave therein less than 0.01% total moisture, thereafter cooling the thus treated gas to condense liquid nitrosyl chloride therefrom, and maintaining the dry, liquid nitrosyl chloride thus obtained separate from the liquid nitrosyl chloride contacted with said moist gas.

3. The process for drying a moist gaseous mixture of nitrosyl chloride and chlorine which comprises scrubbing said moist gas by direct contact with a mixture of liquefied nitrosyl chloride and chlorine contacted with the gas in proportions of about 1 part by weight of the liquid to 4 to 40 parts by weight of the gaseous nitrosyl chloride and chlorine, and thereby drying said gas to a residual total moisture content of less than 0.01%.

4. The process for obtaining dry, liquid nitrosyl chloride from a moist nitrosyl chloride-chlorine gas evolved from an aqueous reaction mixture of nitric acid and a metal chloride which comprises cooling and drying said moist gas by passing it in contact and in countercurrent flow with a mixture of liquid nitrosyl chloride and chlorine while maintaining the temperature of the liquid where it last contacts with the gas at about 0° C., cooling the gas to liquefy the nitrosyl chloride and chlorine contained therein, utilizing a portion only of the liquefied nitrosyl chloride and chlorine thus obtained as the aforesaid mixture of liquefied nitrosyl chloride and chlorine contacted with said moist gas to dry it, and maintaining separate from the aforesaid portion another portion of the liquefied nitrosyl chloride and chlorine without contacting it with said moist gas.

5. The process for producing a dry nitrosyl chloride-chlorine gas which comprises heating an aqueous reaction mixture containing nitric acid and a metal chloride to evolve a moist nitrosyl chloride-chlorine gas, passing said moist gas in direct contact with cold nitric acid and thereby absorbing water from the gas and partially drying the gas by contact with the cold nitric acid, thereafter scrubbing the partially dried gas with a mixture of liquefied nitrosyl chloride and chlorine to remove from the gas residual moisture contained therein leaving a dry nitrosyl chloride-chlorine gas, mixing the liquid containing water removed from said gas by treatment with said liquid mixture of nitrosyl chloride and chlorine with said cold nitric acid which is contacted with said moist gas to preliminarily dry it and incorporating said nitric acid after contact with said moist gas in the reaction mixture of nitric acid and metal chloride which is heated to form said moist nitrosyl chloride-chlorine gas.

6. The process for obtaining dry, liquid nitrosyl chloride from a moist nitrosyl chloride gas which comprises passing said moist gas in contact with liquid nitrosyl chloride in apparatus constructed of a non-metallic material resistant to corrosion by the moist gas wherein the gas is dried by contact with said liquid nitrosyl chloride without extraction of heat through non-metallic walls of said apparatus by an extraneous cooling agent, thereafter cooling the thus dried gas in contact with heat transfer surfaces of a metallic material resistant to corrosion by the dried gas to condense liquid nitrosyl chloride therefrom, and maintaining at least a portion of the condensed dry, liquid nitrosyl chloride out of contact with said moist gas.

7. The process for producing a dry nitrosyl chloride-chlorine gas which comprises heating an aqueous reaction mixture containing nitric acid and a metal chloride to evolve a moist nitrosyl chloride-chlorine gas, passing said moist gas in direct contact with cold nitric acid and thereby absorbing water from the gas and partially drying the gas by contact with the cold nitric acid, thereafter scrubbing the partially dried gas with a mixture of liquefied nitrosyl chloride and chlorine in apparatus constructed of a non-metallic material resistant to corrosion by the moist gas wherein residual moisture contained in the gas is removed therefrom by direct contact with said liquefied nitrosyl chloride and chlorine without extraction of heat through non-metallic walls of said apparatus by an extraneous cooling agent, withdrawing from contact with said liquefied nitrosyl chloride and chlorine a dry nitrosyl chloride-chlorine gas, thereafter cooling the thus dried gas in contact with heat transfer surfaces of a metallic material resistant to corrosion by the dried gas to condense liquid nitrosyl chloride and chlorine therefrom, passing a portion of the condensed liquid in contact with said moist gas and separately withdrawing the remaining portion of said condensed liquid, mixing the liquid containing water removed from said gas by treatment with said liquid mixture of nitrosyl chloride and chlorine with said cold nitric acid which is contacted with said moist gas to preliminarily dry it, and incorporating said nitric acid after contact with said moist gas in the reaction mixture of nitric acid and metal chloride which is heated to form said moist nitrosyl chloride-chlorine gas.

8. The process for recovering dry, liquid nitrosyl chloride from a moist gas containing the same which comprises cooling said gas to condense liquid nitrosyl chloride therefrom, maintaining a portion only of the liquid nitrosyl chloride in contact with the moist gas in amount sufficient to dry the gas to below 0.01% total moisture and recovering separate from said portion of liquid nitrosyl chloride another portion of the liquid nitrosyl chloride, the last mentioned portion being condensed from the dried gas and not being permitted to contact with the moist gas.

9. The process for drying a moist nitrosyl chloride gas which comprises introducing said moist gas and vapors of a material from the group consisting of nitric acid and nitrogen peroxide into direct intimate contact with liquid nitrosyl chloride and thereby removing from said gas substantially all its moisture content while withdrawing the major proportion of said nitrosyl chloride gas from contact with the liquid nitrosyl chloride.

10. The process for drying a moist nitrosyl chloride gas which comprises passing said moist gas in direct contact with cold nitric acid of a concentration of at least 40% $HNO_3$ and at temperatures not above 30° C. and thereby absorbing moisture from the gas and partially drying it, thereafter scrubbing the partially dried gas with liquid nitrosyl chloride and thereby removing from the gas residual moisture contained therein leaving a dry nitrosyl chloride gas which is withdrawn from contact with said liquid nitrosyl chloride, mixing the liquid nitrosyl chloride containing moisture removed from said gas with said cold nitric acid which is thereafter contacted with said moist gas to preliminarily dry it, and heating the nitric acid, after it has absorbed moisture from said gas, to a temperature at which hydrochloric acid present in the nitric acid reacts therewith to form nitrosyl chloride and the nitrosyl chloride in said nitric acid, including that formed by reaction of the nitric acid with hydrochloric acid, is evolved therefrom.

11. The process for producing a dry nitrosyl chloride-chlorine gas which comprises passing a moist gaseous mixture of nitrosyl chloride and chlorine in direct contact with cold nitric acid and thereby absorbing moisture from said gaseous mixture and drying it by contact with the cold nitric acid, thereafter scrubbing the partially dried gas with liquid nitrosyl chloride to remove from the gas residual moisture contained therein leaving a dry nitrosyl chloride-chlorine gas, mixing the liquid nitrosyl chloride containing moisture removed from said gas with said cold nitric acid which is contacted with said moist gas to preliminarily dry it, thereafter heating the nitric acid to a temperature at which hydrochloric acid contained therein reacts with the nitric acid to form nitrosyl chloride and chlorine and the nitrosyl chloride and chlorine in said nitric acid, including that formed by reaction of the hydrochloric and nitric acids, are evolved from said nitric acid and incorporating the nitrosyl chloride and chlorine thus evolved with said first mentioned moist nitrosyl chloride-chlorine gas.

12. The process for producing a dry nitrosyl chloride-chlorine gas which comprises introducing a substantially anhydrous liquid mixture of nitrosyl chloride and chlorine into contact with a moist gaseous mixture of nitrosyl chloride and chlorine at a temperature substantially the boiling point of the liquid in contact with the gas, passing said liquid in countercurrent flow with said gaseous mixture at progressively higher temperatures and withdrawing the liquid from contact with the gaseous mixture at a temperature at which nitrosyl chloride and chlorine have been vaporized into the gas from the liquid and the liquid withdrawn from contact with the gaseous mixture is an aqueous nitric and hydrochloric acid solution saturated with nitrosyl chloride and chlorine, said liquid nitrosyl chloride and chlorine mixture being contacted with said moist gaseous mixture in amount sufficient to dry the gas to a residual total moisture content of less than 0.01%.

HERMAN A. BEEKHUIS, Jr.

2,320,257

CERTIFICATE OF CORRECTION.

Patent No. 2,320,257. May 25, 1943.

HERMAN A. BEEKHUIS, JR.

It is hereby certified that error appears in the printed specification of the above numbered patent requiring correction as follows: Page 3, first column, line 28, for "10 C." read --10° C.--; line 45, for "0.10%" read --0.01%--; and that the said Letters Patent should be read with this correction therein that the same may conform to the record of the case in the Patent Office.

Signed and sealed this 6th day of July, A. D. 1943.

(Seal)

Henry Van Arsdale,
Acting Commissioner of Patents.